April 18, 1933.  W. A. MEADOR  1,903,911
AERIAL NAVIGATOR
Filed July 18, 1930  2 Sheets-Sheet 2

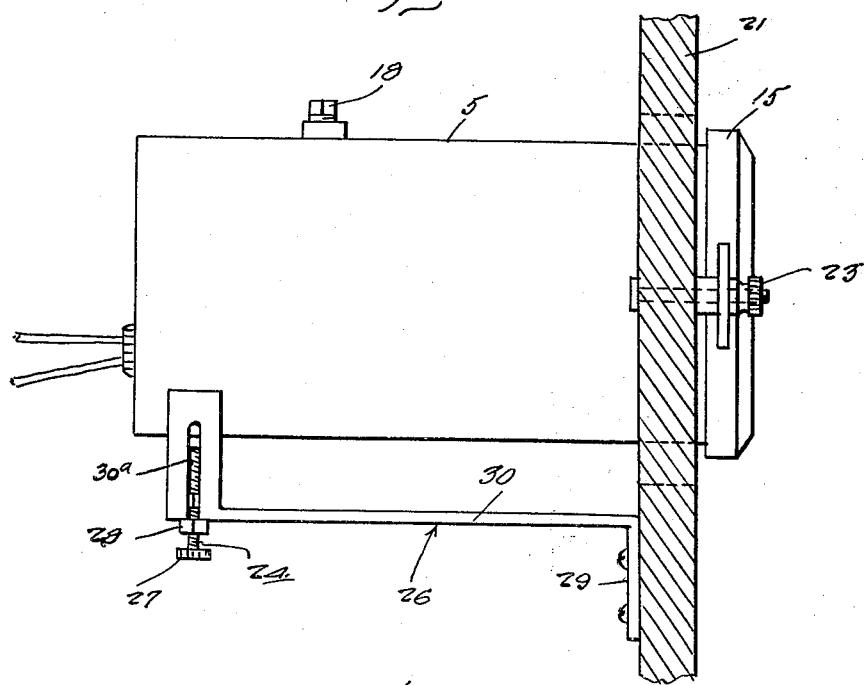
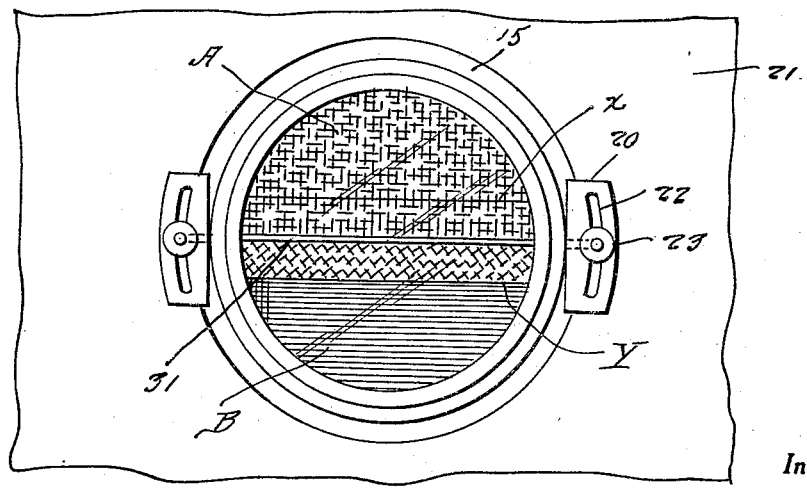

Inventor
W. A. Meador
By Clarence A. O'Brien
Attorney

Patented Apr. 18, 1933

1,903,911

UNITED STATES PATENT OFFICE

WALTER A. MEADOR, OF GALLATIN, TENNESSEE

AERIAL NAVIGATOR

Application filed July 18, 1930. Serial No. 471,564.

This invention relates to aerial navigation instruments enabling blind flying, night flying, and flying by dead reckoning.

An important object of the invention is to provide an instrument of this kind which combines the functions of an inclinometer and bank indicator and which operates upon a new and novel principle whereby increased safety and efficiency in the navigating of aircraft is attainable.

Another important object of the invention is to provide the pilot of an aircraft with means to navigate his craft while enclosed in a cabin, at night, or in heavy weather, which obscures the actual horizon, which includes means enabling him to guide his craft in level flight and to guide the same in any desired maneuvers, said means consisting of a single instrument which, being artificially illuminated, will indicate at a glance under such conditions the exact angular position of his craft with reference to the invisible horizon.

Another important object of the invention is to provide an instrument of this type, which will enable an air pilot to properly bank the plane for turning about a vertical axis and to be guided in performing such turning maneuvers to the same degree as when the real horizon is visible.

Another object of the invention is to provide an air pilot with means to maintain flight in clouds or darkness in an inclined or declined plane with respect to the horizontal and avoid the danger of climbing or losing height too steeply.

Another object of this invention is to enable an air pilot in an enclosed cabin to hold his craft up to the highest safe gliding angle without unnecessary sacrifice of comfort, so as to prevent the danger of attempting a landing at an angle below the safe gliding angle of his craft.

It is also an important object of the invention to provide the device of my invention with novel lighting means which operates to maintain the novel indicating means of the invention clearly visible at all times.

These and other objects of the invention, and its composition, and combination and arrangement of parts, will be apparent to anyone conversant with the art to which this invention relates upon reading the following description in connection with the appended drawings, in which:

Figure 1 is a side elevational view of the device of the invention showing it installed in a dashboard of an aircraft.

Figure 2 is a front elevational view of the device installed in the dashboard of an aircraft.

Figure 3:
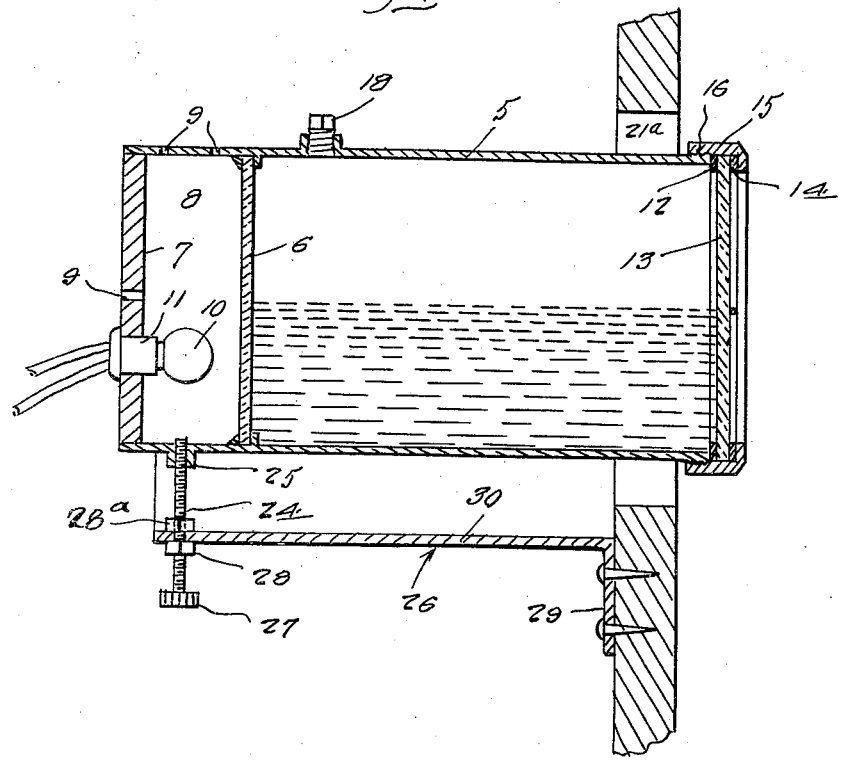
Figure 3 is a vertical longitudinal sectional view through Figure 1.
Figure 4:
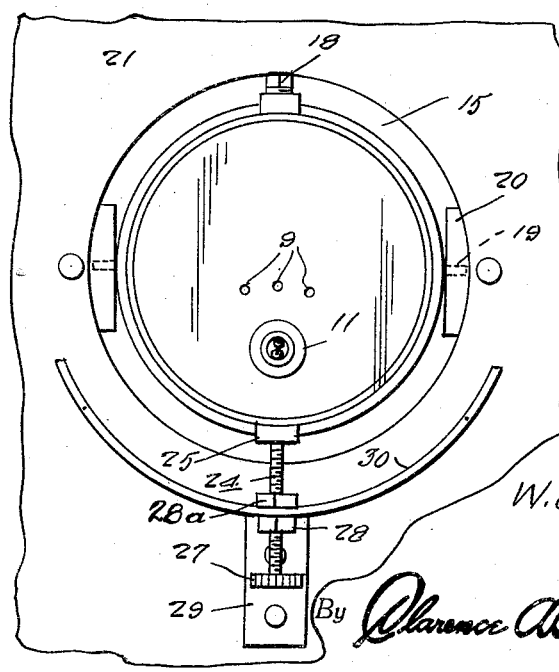
Figure 4 is a rear elevational view of Figure 1.

It is to be definitely understood that I do not desire to limit the application of this invention to the particular embodiment herein described and illustrated, and any changes in size, shape, materials or structure may be made as desired, which come within the scope and spirit of the invention as claimed.

Referring in detail to the drawings:

A liquid tight cylinder 5 has a transparent glass partition 6 near its rear end and a rear head at 7 which arrangement forms a space 8. Ventilation holes 9 are formed in the wall of the cylinder and commmunicate the space 8 with the outside air so as to permit escape of heat from an electric bulb 10 of small size which is mounted through the head 7 in the space 8 and has its socket 11 positioned in the lower part of the head 7. The head 7 is constructed of wood or other di-electric material. Through the provision of the ventilation means for the space 8, overheating of the liquid to be placed in the cylinder is prevented.

The front end of the cylinder is provided with a ring gasket 12 held in position by a translucent glass disc 13 which constitutes the dial of the instrument and another gasket 14 is disposed exteriorly of said disc 13 and the gaskets and the disk 13 are held and pressed to the end of the cylinder in liquid tight relationship by a flanged and bevelled rim 15 which is screwed upon the end of the cylinder as at 16.

A filling plug 18 in the top side of the cylinder permits filling the interior of the cylinder with the indicating liquid to be described.

Projecting at diametrically opposite points slightly back of the front end of the cylinder 5 is a pair of gimbal ears or lugs 19 by which the cylinder is pivotally suspended upon brackets 20. The brackets have the arcuate slots 22 to receive adjusting screws 23 mounted through the dashboard adjacent in the hole 21ª in the dashboard. This arrangement is such that the cylinder may be rotated and then fixed in a desired position when calibrating the same.

The rear end of the cylinder 5 is supported adjustably by a vertical screw 24 threaded into a neck 25 depending from the bottom of the cylinder, and is threaded through nuts 28 and 28ª, and passed through a slot 30ª in a bracket 26. The lower end of the screw 24 has a knurled finger nut 27 at its lower end.

Upon moving the screw 24 in one direction, after loosening the nuts 28, 28ª, the rear end of the cylinder 5 will be elevated with respect to the bracket 26, and upon moving the screw 24 in the opposite direction, the rear end of the cylinder 5 will be lowered toward the bracket 26. When the desired adjustment of the cylinder has been made, the nuts 28, 28ª may be worked into engagement with opposite sides of the bracket 26 to lock the screw 24 against being inadvertently rotated out of adjustment.

The bracket 26 comprises a vertical dash attaching portion 29 and a horizontal extension 30 which has at its rear end a right angularly disposed arcuate member having approximately the same curvature as the wall of the cylinder 5 in which is provided the slot 30a permitting movement of the screw 24. The bracket 26 is attached to the rear of the dashboard in any desired manner in spaced relation under the cylinder 5.

The cylinder 5 is filled about half full with a non-contracting and non-expanding liquid, such as glycerine, kerosene or other similar non-volatile liquid so that the level thereof reaches a point about one-half the height of the indicator disk or dial 13. Coloring matter is mixed with the liquid to give it a blue color, or some other dark color so as to make the liquid easily visible through the ground glass or translucent dial 13. The dial 13 has a horizontal diameter mark or longitudinal equator 31 which is molded or otherwise permanently made in the indicator disk 13.

The half of the dial 13 below the equator line is colored a light brown or a mottled brown and green to suggest as much as possible the appearance of the earth, said coloring being translucent so that the colored liquid in the cylinder may be seen therethrough and the upper half of the dial 13 is colored a very light translucent shade of cream yellow or azure blue so as to suggest the sky on a clear day and provide a strong contrast to the dark blue liquid within the cylinder as the bulb 10 casts its light through the cylinder.

Additional meridians X and Y seen in Figure 2 are spaced as desired from and parallel to the equator line 31. These meridians X and Y may be wires or other means which may be adjusted and maintained in adjusted positions with relation to and parallel to the main equator line 31 by any desired means, for a purpose hereinafter described.

The instrument is calibrated for the aircraft for which it is intended by mounting it therein and adjusting the cylinder on its axis by means of the screws 23, and adjusting its angularity to the horizontal by means of the screw 24; when the instrument is properly adjusted, the dark liquid coincides with the equator line 31 in the reading dial 13.

When it is desired to adjust the instrument by rotating it on its axis, the screws 23 are loosened as well as the lock nuts 28 and 28ª on the screw 24. This permits movement of the screws 23 in the slots 22 of the brackets 20 and movement of the screw 24 in the slot 30ª in the bracket 26, when the cylinder is rotated. When the desired adjustment has been reached, the screws 23 are tightened against the bracket 26.

The use and operation of the device is as follows:

When the craft is in level horizontal flight, the dark liquid will meet the horizontal equator line 31, and when the plane is climbing the dark liquid will find a level above the equator line 31, and when the aircraft is pointed toward the earth, the level of the dark liquid will define a line below said equatorial line 31. Advantage is taken of this by providing a positioning of the meridian lines X and Y such as to indicate to the pilot the safe climbing and the safe gliding angles of the ship. The positions of said lines X and Y are determined by actual experiment with the particular aircraft on which the device is to be installed. Thus when flying blind, or in dark night or thick weather, the pilot will be enabled to know instantly whether his ship, if pointed toward the earth is above or below the safe gliding angle, as indicated by the line Y, or if the craft is directed into a climbing angle above or below the safe climbing angle as indicated by the level of the liquid with respect to the line X.

The upper half A of the dial being colored cream or azure colored to represent the sky, and the lower half B being colored brown or green to represent the earth, the relationship of the level of the liquid to the artificial horizon 31 enables the pilot to judge exactly his horizontal and vertical angle with respect to the horizon of the earth when executing maneuvers. When the plane is pointed almost directly toward the earth, the liquid in the cylinder will fall to the rear end of the cylinder and the indicator dial will become entirely darkened. The same phenomenon will obtain when the craft is pointed almost directly away from the earth in a steep climb, since the liquid in the cylinder will completely fill the front end of the cylinder.

It is important to understand that the diameter of the cylinder is approximately one-half of its length and that these proportions are recited as necessary to the successful functioning of the device.

The operation of the device now being understood, it will be evident that I have provided an instrument of the character described, which is admirably suited for the purposes to which it is designed, because of its ease and simplicity of operation, accuracy and dependability. It will also be observed that in my device I have achieved inexpensiveness of manufacture, and ease of installation and calibration.

It will also be evident that I have provided a device of this kind which eliminates the necessity of using two or more instruments for supplying the equivalent of the information indicated by my improved instrument, and thereby simplifies the navigation of aircraft and reduces the expense of equipping said aircraft with navigation instruments, while increasing the safety and convenience of operation thereof.

I have designated this embodiment of my invention as a "horimeter" to distinguish it from the well known aerial navigation instrument designated by the term "horizometer" which is also in use for the navigation of water craft.

I claim:

1. An aerial navigation instrument for an aircraft instrument board provided with a hole comprising a cylinder containing a fluid, said cylinder being mounted in and having one end thereof projecting through the hole in the instrument board, a filler opening for the cylinder, a filling plug in said opening, gimbal ears on the front end of the cylinder, adjusting brackets mounted on said instrument board to receive said gimbal ears, said brackets adapted to permit partial rotation of said cylinder on its axis, a di-electric opaque head on the rear end of the cylinder, a transparent liquid-tight partition in the rear end of the cylinder and spaced from the opaque head so as to form a chamber, an electric bulb in the chamber and a socket for the bulb mounted in the lower portion of said head, said chamber being provided with ventilation means; and an angle bracket mounted to the rear of the instrument board below the cylinder and extending rearwardly to a point below the rear end of the cylinder, and a lockable vertical adjusting screw on said bracket adapted to raise or depress the rear end of the cylinder with respect to the horizontal, and a translucent indicator dial closing the front end of the cylinder, a fixed horizon line and other adjustable parallel-line means on said dial, said dial being darkened below the horizon line, and a bevelled flanged ring adapted to confine said dial on the end of the cylinder.

2. An aerial navigation instrument for mounting through an aircraft instrument board, comprising a cylinder of a length approximately twice the measurement of its diameter, a multi-colored translucent indicator dial in the front end of the cylinder, a head in the rear end of the cylinder, a transparent partition spaced therefrom forming a chamber in the rear end of the cylinder the chamber being provided with ventilating means, an electric lamp in the chamber, and a dark colored liquid approximately half filling said cylinder, a horizon mark on said indicator dial, and other adjustable horizontal marks parallel thereto, and a flanged ring on the front end of the cylinder to confine said dial thereon, and means for adjustably mounting said cylinder on the instrument board.

3. A combined inclinometer and bank indicator for aircraft comprising a closed cylinder having a diameter of half its length, a dark liquid half filling said cylinder, a translucent dial mounted in the front end of the cylinder, a horizon line on said dial, and a flanged ring engageable with the cylinder for retaining said dial in position on the front end of the cylinder, and means at the rear end of said cylinder for illuminating said dial, said dial having its lower half translucently colored to represent the earth, and its upper half translucently colored to represent the sky, and adjustable means for mounting said cylinder in an aircraft.

In testimony whereof I affix my signature.

WALTER A. MEADOR.